Feb. 14, 1933. V. PAQUIT 1,897,817
MECHANICAL COMBINATION FOR REVERSIBLE PITCH PROPELLERS
Filed Dec. 11, 1929
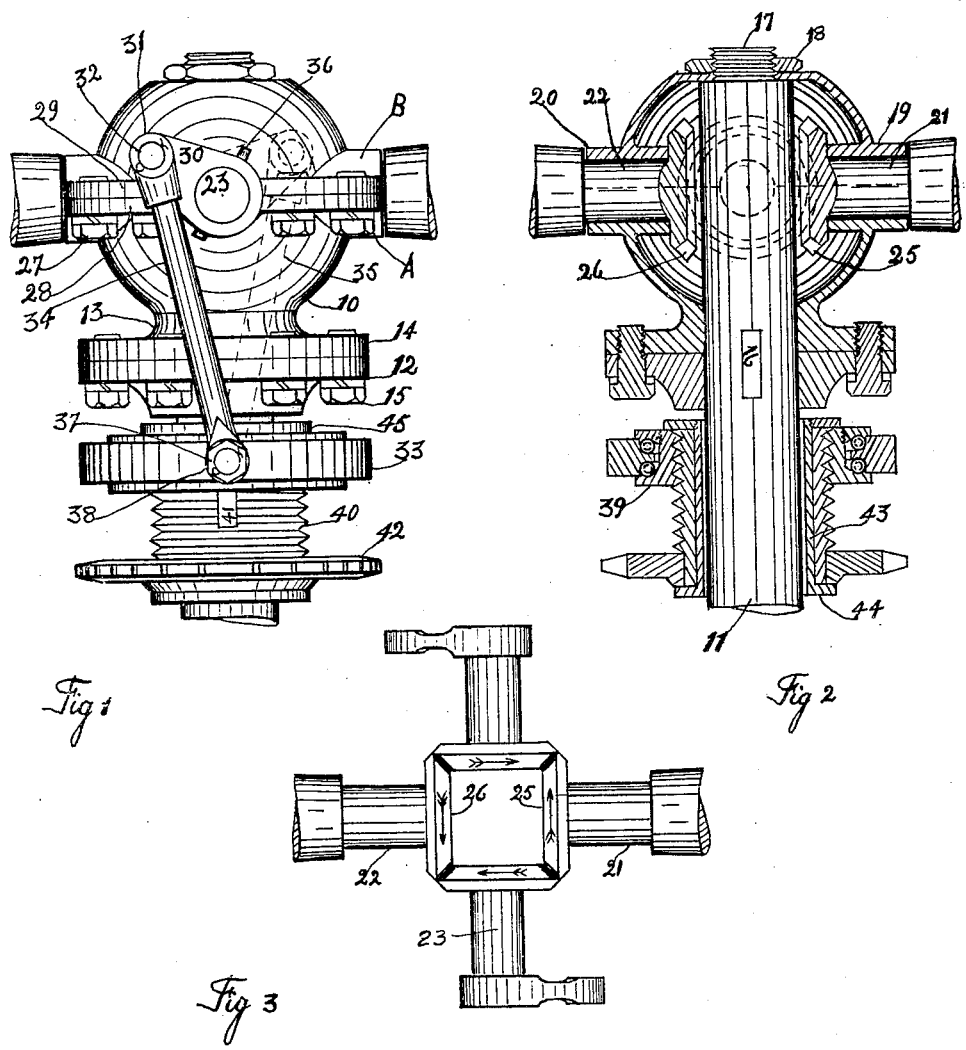
INVENTOR.
Vital Paquit Patented Feb. 14, 1933

1,897,817

UNITED STATES PATENT OFFICE

VITAL PAQUIT, OF NEW YORK, N. Y.

MECHANICAL COMBINATION FOR REVERSIBLE PITCH PROPELLERS

Application filed December 11, 1929. Serial No. 413,275.

My invention relates primarily to mechanically controlled propeller pitch especially that of aeroplanes, although some of the features are useful in connection with the cooling system of certain internal combustion engines, and other apparatus using propeller.

One of the objects of the invention is to provide to aeroplanes a system of reversible propulsion, the combination of which shall be simple, reliable, and efficient.

Another object of the invention is to provide to other apparatus using propeller, a system of pitch adjustment of the propeller blades whereby the use of a propeller may be more advantageously put in practical use.

My invention is concerned with a mechanism comprising a gearing arrangement located in the center of a propeller, which in its present form, is made of two separate portions movable upon their axis by means of the gearing arrangement mentioned.

The details of the nature of my invention will be more understood from the following description in connection with the accompanying drawing in which Fig. 1 is the complete assembly of the mechanical combination Fig. 2 is a cross section of the assembly Fig. 3 shows the relation of bevel gears in full lines.

Referring to Fig. 1, a mounting frame 10 providing a housing for gearing arrangement and formed of two parts, A and B, is secured in fixed position upon the propeller driving shaft 11 (Fig. 2) which has a coupling 12 keyed thereon. The part A of the frame is contracted with a neck 13 to provide a flange 14 for attachment to the coupling 12 by means of bolts as indicated at 15, and key 16 (Fig. 2) lock both the mounting frame and coupling against axial motion on the driving shaft. As shown in Fig. 2, the end of the driving shaft is machined with a threaded stub 17, and part B of the mounting frame 10 (Fig. 1) is also contracted, but only to provide a flat surface for connection with the shaft 11 on which stub 17 locks the propeller assembly against lateral motion by means of the nut 18. The mounting frame has a four bearings arrangement, two of which clearly shown at 19 and 20 (Fig. 2) and all of which are properly designed for axial motion of the propeller portions 21 and 22 and pinion shafts 23 (Fig. 1) and 24 not shown in view of its diametrical position to pinion shaft 23. Thus with a two bladed propeller as illustrated herein, the axis of the bearings arrangement provide a 90° angle between each bearing which as shown at 19 and 20 (Fig. 2) are diametrically opposed to each other in pairs, and perpendicular to the axis of the driving shaft. Preferably, a bevel gear 25 is forged and machined on the end portions of the propeller for which two pinions provided with a short shaft extending outside of their bearing as at 23 engage the gear 25 and 26 of the propeller portions as shown in Fig. 3 whereby it will be seen that the gearing arrangement provides a motion of inverse direction to the propeller blades which by means of further mechanical arrangement hereafter described will be shown provided with a means for reversible propulsion. But before going into details therefor, it will be noted that to permit the mounting of the gearing arrangement within the mounting frame 10 (Fig. 1) the parts A and B thereof split through the center of the bearings, and their assembly is secured by means of bolts as shown at 27 for which a flange 28 and 29 is provided to parts A and B of the mounting frame.

Referring to the pinion shafts, an arm 30 provided with a knuckle joint 31 and pivot 32 (Fig. 1) is provided to the shaft of both pinions of which the pinion arm shown in dotted line and opposed to that clearly shown at 30 is mounted for a reversed rotation to correspond to a lateral motion of a thrust collar 33 mechanically connected in pivotal attachment with the knuckle joints of the pinion arms by means of a rod 34 clearly shown in the drawing and rod 35 shown in dotted lines. Each arm is keyed to its pinion shaft in the usual manner but are also provided with a tapered pin 36 to provide against centrifugal force, each rod has a threaded end entering the sleeve of the knuckle joints and the other end forged with a head to connect with the collar 33 which provides two stubs diametrically opposed to each other for this purpose and upon which I prefer to use a nut as shown at 37 to hold the head 38 of the rod in pivotal attachment. The thrust collar permits the rods connected thereto to revolve, and also establish a means of connection between stationary and rotary parts which I reliably accomplish by means of a double way thrust bearing 39 which does not need further explanation in view of its well known use except for its departure from standard construction. Its inner ring is threaded and provided with three apertures 120° apart to cause, first, a rotatable threaded bushing or sleeve 40 to operate the thrust collar 33 in a lateral motion, and second, to prevent the thrust bearing from axial motion by means of conveniently appropriated guides as shown at 41 which slide through the apertures mentioned, when bushing 40 is operated by sprocket 42 keyed thereon. The bushing 40 is preferably made of bronze material and mounted to operate upon a steel neck 43 provided in firm attachment on the engine by means of a flange 44 and with sufficient clearance to avoid friction between driving shaft and neck of which the latter has provided thereto a stop collar 45 solidly mounted on the end of the neck, and preferably made in a one piece stamped material for both the collar and guides previously referred to, the stop collar preventing lateral motion of bushing 40 when thrust collar 33 is in operation.

It will thus be seen that by means of a chain sprocket combination, which is well known in practical use, a shaft with a handle provided within a reach in the cockpit of an airplane, will permit the aviator to operate the pitch of his propeller blades, as per motion of the handle mentioned, the chain sprocket combination will operate the threaded bushing 40 upon which the thrust bearing 39, held in position for lateral motion by means of guides as indicated at 41, will be pulled or pushed off its position with which the thrust collar 33 will move therewith. Consequently, the rods 34 and 35 connected to the thrust collar and knuckle joints of the pinion arms are permitted to revolve with the propeller assembly and keep a mechanical connection with stationary parts in which when thrust bearing 39 operates the thrust collar 33, will operate the pinions mounted within the housing of mounting frame 10 in which, as explained, the gearing arrangement, as shown in Fig. 3, operates the propeller portions in opposite direction, which is in accordance with the displacement of the thrust collar 33 by means of thrust bearing 39 on bushing 40, whereby my present combination of mechanical parts provides an adjustable pitch propeller for varied or reversible propulsion.

By reference to the drawing and description, I show and describe a mechanical combination including a gearing arrangement, but it will be seen that the gearing arrangement may be omitted by providing to the propeller blades the arms of the pinions. It will also be seen that a gearing arrangement of the class described provides for propeller having more than two blades, and that by reference to the drawing, the neck shown at the mounting frame may also be omitted and substituted by a cylindrical form for attachment, and for these reasons, I desire to point out that changes may be made within the spirit of the invention to suit certain requirements, and what I claim is:

1. In a flying machine having a propeller shaft, a drive head of spherical form made of two parts split through the axis of the propeller blades, pinion gears with shafts radially mounted in said head, each pinion gear shaft having an arm connecting to a thrust collar, said collar moving longitudinally by means of a rotatable threaded sleeve, a stop thrust collar for said sleeve, and a demountable neck for supporting said sleeve.

2. In a flying machine having geared propeller blades, a drive head made of two parts split through the axis of radial bearings, a pinion gear with radial axis mounted between two propeller blades, and a rotatable threaded sleeve for operating said pinion through a thrust collar and anti-friction bearing.

Signed at New York city, in the county of New York, and State of New York, December, 1929.

VITAL PAQUIT.